United States Patent
Agarwal et al.

(10) Patent No.: US 9,032,057 B2
(45) Date of Patent: May 12, 2015

(54) SECURE STACKING SETUP IMPLEMENTING USER INTERFACE OF STACKING DEVICE

(75) Inventors: Bipin Agarwal, San Jose, CA (US); Kwun-Nan Kevin Lin, Saratoga, CA (US); Marc Lewis Lavine, Sunnyvale, CA (US); Rajeshekhar Murtinty, San Jose, CA (US); Seyung Oh, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 437 days.

(21) Appl. No.: 12/419,241

(22) Filed: Apr. 6, 2009

(65) Prior Publication Data

US 2010/0257283 A1   Oct. 7, 2010

(51) Int. Cl.
*G06F 15/16*   (2006.01)
*H04L 12/24*   (2006.01)
*H04L 29/06*   (2006.01)
*G06F 17/30*   (2006.01)
*H04L 12/931*   (2013.01)

(52) U.S. Cl.
CPC ........ *H04L 41/0846* (2013.01); *H04L 41/0806* (2013.01); *H04L 49/351* (2013.01); *H04L 63/08* (2013.01); *G06F 17/30575* (2013.01)

(58) Field of Classification Search
CPC .. H04L 41/0806; H04L 49/351; H04L 45/583
USPC .................. 709/201, 203; 370/252, 235, 389
See application file for complete search history.

(56) References Cited

U.S. PATENT DOCUMENTS

| | | |
|---|---|---|
| 5,481,073 A | 1/1996 | Singer et al. |
| 5,651,003 A | 7/1997 | Pearce et al. |
| 6,373,840 B1 | 4/2002 | Chen |
| 6,490,276 B1 | 12/2002 | Salett et al. |
| 6,496,502 B1 | 12/2002 | Fite et al. |
| 6,516,345 B1 | 2/2003 | Kracht |
| 6,526,345 B2 | 2/2003 | Ryoo |
| 6,839,342 B1 | 1/2005 | Parham et al. |
| 6,839,349 B2 | 1/2005 | Ambe et al. |
| 7,099,315 B2 | 8/2006 | Ambe et al. |

(Continued)

OTHER PUBLICATIONS

Juniper Networks datasheet entitled: "Juniper Networks EX 4200 Series Ethernet Switches with Virtual Chassis Technology", 27 pages, date unknown.

(Continued)

*Primary Examiner* — Djenane Bayard
(74) *Attorney, Agent, or Firm* — Conley Rose, P.C.

(57) ABSTRACT

A method of configuring a stack includes: connecting stacking ports of a plurality of stackable devices using one or more stacking links; connecting a user console to a first one of the stackable devices; transmitting a stack setup command from the user console to the first stackable device; and establishing a stack in response to the stack setup command. The stack is established by initiating a discovery process with the first stackable device in response to the stack setup command, wherein the first stackable device requests and receives identifying information from the stackable devices over the stacking links during the discovery process. The topology of the stackable devices is displayed with the user console in response to the identifying information. The stackable devices are authenticated during the discovery process such that the stack setup is secure. The first stackable device becomes the active controller of the stack by default.

35 Claims, 3 Drawing Sheets

(56) References Cited

U.S. PATENT DOCUMENTS

| | | |
|---|---|---|
| 7,106,736 B2 | 9/2006 | Kalkunte |
| 7,136,289 B2 | 11/2006 | Vasavda et al. |
| 7,184,441 B1 | 2/2007 | Kadambi et al. |
| 7,206,283 B2 | 4/2007 | Chang et al. |
| 7,336,622 B1 | 2/2008 | Fallis et al. |
| 7,697,419 B1 * | 4/2010 | Donthi .................. 370/220 |
| 2005/0063354 A1 * | 3/2005 | Garnett et al. ............ 370/351 |
| 2005/0271044 A1 | 12/2005 | Hsu et al. |
| 2006/0013212 A1 * | 1/2006 | Singh et al. ............. 370/389 |
| 2006/0092853 A1 * | 5/2006 | Santoso et al. ........... 370/252 |
| 2007/0081463 A1 * | 4/2007 | Bohra et al. ............. 370/235 |
| 2008/0137530 A1 | 6/2008 | Fallis et al. |

OTHER PUBLICATIONS

Juniper Networks Datasheet entitled "EX4200 Ethernet Switches with Virtual Chassis Technology," Dated Aug. 2013 (12 p.).

* cited by examiner

SECURE STACKING SETUP
IMPLEMENTING USER INTERFACE OF
STACKING DEVICE

FIELD OF THE INVENTION

The present invention relates to an improved method for configuring a stack from a plurality of stackable network switches.

RELATED ART

Local area networks (LANs) may be implemented using a chassis-based system, which includes a fixed chassis that supports a common backplane (i.e., a hardwired circuit board). The fixed chassis includes a plurality of slots for receiving and supporting a plurality of network switches (blades). When inserted into the slots in the chassis, connectors on the network switches engage with corresponding connectors in the backplane, whereby electrical connections are formed between the network switches and the backplane. The backplane provides electrical connections between the connected network switches, and allow the plurality of network switches to be operated as a single management unit. A slot number is assigned to each connector in the backplane in order to identify the placement of each network switch within the backplane. The slot numbers are fixed, and cannot be modified or assigned by the user of the chassis-based system. The hardwired nature of the backplane and the fixed slot numbers cause the configuration of the chassis-based system to be inflexible. Another disadvantage of the chassis-based system is the relatively large initial cost associated with purchasing the chassis/backplane.

An alternate system of connecting a plurality of network switches into a single management unit is a stackable switch system. A stackable switch system does not use a fixed chassis or a backplane. Rather, a stackable switch system includes a plurality of network switches that are connected by cables that extend between dedicated stacking ports of the network switches. These cables effectively replace the backplane of the chassis-based system. In a stackable switch system, the network switches may be connected in various topologies by re-arranging the cables. However, each of the network switches connected in a stackable switch system must be initially configured by connecting a user console to a user interface of the network switch (through a cable), and then accessing a command line interface (CLI) within the network switch. Because the user console must be individually connected to each of the network switches, the configuration process is cumbersome. Moreover, the user does not have an efficient way to assign the master role to any particular network switch in the stackable switch system. In addition, the user must individually access multiple CLIs (in the different network switches) to renumber the network switches included in the stack. Moreover, the user is not presented with an overall view of the configured stack.

It would therefore be desirable to have a manner of configuring a stack, which overcomes the above-described deficiencies.

SUMMARY

Accordingly, the present invention provides an improved method for establishing a stack using a plurality of stackable network switches (hereinafter referred to as stackable devices). The stackable devices are initially connected by a plurality of stacking links (cables), wherein each stacking link joins a stacking port of one stackable device to a stacking port of another stackable device. The stacking links may join the stackable devices in a ring topology or a linear topology. A user console is connected to a user interface of one of the stackable devices. By default, the stackable device connected to the user console initially becomes the active controller (master) of the stack. A secure stack setup command is transmitted from the user console to the connected stackable device (hereinafter, 'the first stackable device). The first stackable device initiates a discovery process in response to the secure stack setup command, wherein the first stackable device requests and receives identifying information from the other stackable devices over the stacking links. Authentication of the stackable devices is performed during the discovery process, thereby preventing unauthorized devices from joining the stack. Any passwords required by the stackable devices may be entered via the user console, which remains connected to the first stackable device. The user console displays a topology of the stackable devices in response to the identifying information gathered during the discovery process. In one embodiment, the topology identifies the stackable devices upstream and downstream from the first stackable device, and the number of hops from the first stackable device to the other stackable devices. The user console may be used to modify the topology of the stackable devices. The user console may also be used to select stack ID values for the various stackable devices. In this manner, the present invention provides a simple and flexible method for configuring a stack, wherein the stack configuration can be easily viewed by the user.

The present invention will be more fully understood in view of the following description and drawings.

DETAILED DESCRIPTION

Figure 1:
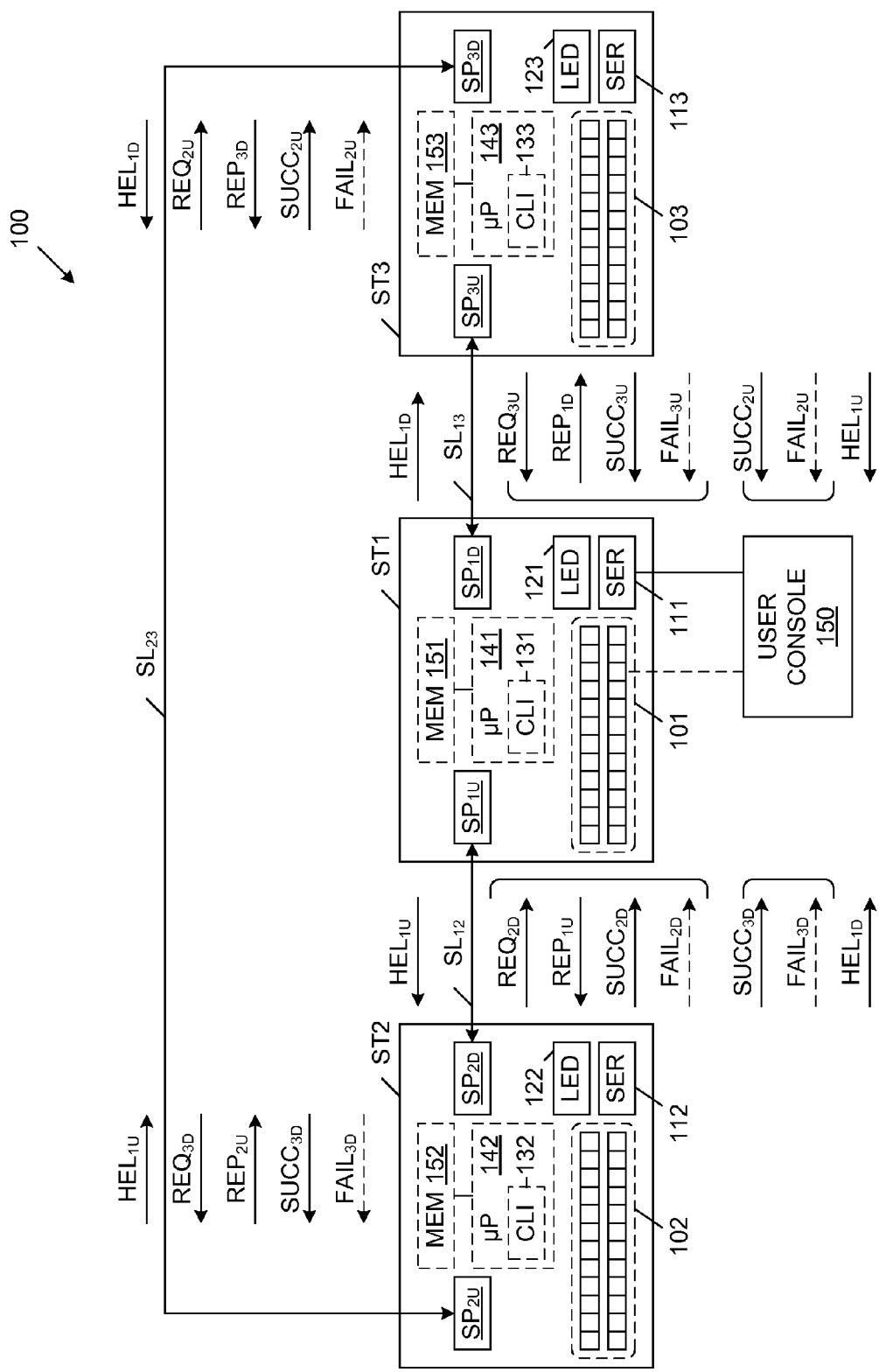
FIG. 1 is a block diagram of a stack that includes three stackable devices, which are configured in a ring topology in accordance with one embodiment of the present invention.

FIG. 1 is a block diagram of a stack 100 that includes three stackable devices (e.g., network switches) ST1, ST2 and ST3, which are configured in a ring topology in accordance with one embodiment of the present invention. As described herein, a 'stack' is a group of stackable devices that are connected to operate as a single management unit having a single internet protocol (IP) address. Although stack 100 includes three stackable devices ST1-ST3, in the embodiments described herein, a stack may include up to eight stackable devices. In yet other embodiments, a stack may be limited to another number of stackable devices.

Stackable devices ST1, ST2 and ST3 include data port sets 101, 102 and 103, respectively, direct serial (console) ports 111, 112 and 113, respectively, LED displays 121, 122 and 123, respectively, command line interface (CLI) logic 131, 132 and 133, respectively, processors 141, 142 and 143, respectively, memory blocks 151, 152 and 153, respectively, and stacking ports $SP_{1U}$-$SP_{1D}$, $SP_{2U}$-$SP_{2D}$ and $SP_{3U}$-$SP_{3D}$, respectively. In general, memory blocks 151-153 store computer executable instructions that, when executed by the corresponding processors 141-143, cause the stackable devices ST1-ST3 to operate in the manner described in more detail below. Memory blocks 151-153 also store identifying information specific to the associated stackable devices ST1-ST3.

In the described embodiments, each of the data port sets 101-103 includes a plurality of data ports (e.g., 10/100/1000 Ethernet ports), which are used to connect to network devices (not shown) to the stack 100. These network devices can include, for example, computing resources such as workstations, servers, printers and storage devices. Data port sets 101-103 are well known to those of ordinary skill in the art. In general, stack 100 controls the routing of data (packets/frames) between network devices coupled to different stackable devices ST1-ST3.

The command line interface (CLI) logic within each stackable device can be accessed through the corresponding direct serial port, or through one of the data ports of the corresponding stackable device, in a manner known to those of ordinary skill in the art. In accordance with the described embodiments of the present invention, a user console 150 is configured to access CLI logic 131 in stackable device ST1 through direct serial port 111 or through one of the ports of the data port set 101. As described in more detail below, user console 150 controls the setup of stack 100 through CLI logic 131 (and the corresponding processor 141). Only one user console 150 is required to complete the setup of stack 100. Advantageously, this user console 150 only needs to be connected to a single stackable device (e.g., stackable device ST1) to complete the setup of stack 100.

By default, the stackable device coupled to user console 150 during the setup of stack 100 initially becomes the master, or active controller, of stack 100. Thus, in the described embodiments, stackable device ST1 becomes the active controller of stack 100. Stackable device ST1, as the active controller, manages the entire stack 100.

In the embodiments described herein, each of the stackable devices ST1-ST3 includes two high-bandwidth (e.g., 10G) stacking ports. Each of the stackable devices ST1-ST3 includes one stacking port designated as an upstream stacking port (and labeled with the subscript 'U'), and one stacking port designated as a downstream stacking port (and labeled with the subscript 'D'). Thus, stacking ports $SP_{1U}$, $SP_{2U}$ and $SP_{3U}$ are upstream stacking ports, and stacking ports $SP_{1D}$, $SP_{2D}$ and $SP_{3D}$ are downstream stacking ports. The upstream stacking ports $SP_{1U}$, $SP_{2U}$ and $SP_{3U}$ are coupled to the downstream stacking ports $SP_{2D}$, $SP_{3D}$ and $SP_{1D}$, respectively, by stacking links (cables) $SL_{12}$, $SL_{23}$ and $SL_{13}$, respectively. Each stacking link is a point-to-point link that allows the bi-directional transfer of packets between the stacking ports joined by the stacking link.

The setup of stack 100 will now be described in more detail. Stackable devices ST1-ST3 are initially cabled in a linear or ring topology, connecting only those stackable devices that will be active in the stack 100. In the embodiment of FIG. 1, the stack 100 is cabled in a ring topology. (A linear topology is described in more detail below in connection with the stack 300 of FIG. 3.) Stackable devices ST1-ST3 are then powered on, and the user console 150 is connected to the intended active controller, which in the present example, is stackable device ST1.

The user enters a 'stack enable' command on the user console 150. This 'stack enable' command is transmitted from user console 150 to CLI logic 131 of stackable device ST1. In response, processor 141 enables stackable device ST1 to operate as a member of a stack. Advantageously, the 'stack enable' command does not need to be individually issued to each of the other stackable devices ST2-ST3 of stack 100.

The user then enters a 'stack secure setup' command on the user console 150. This command is transmitted from user console 150 to the CLI logic 131 of the stackable device ST1. As described in more detail below, the entire stack 100 is configured in response to the 'stack secure-setup' command. The 'stack secure setup' command received by CLI logic 131 causes processor 141 to execute a set of computer executable instructions stored by memory 151, thereby causing processor 141 to implement a discovery process in both the upstream and downstream directions, starting from stackable device ST1. The discovery process produces a list of upstream and downstream stackable devices that are available to join the stack 100.

Upon receiving the 'stack secure setup' command, processor 141 assigns a priority value to stackable device ST1, wherein the assigned priority value helps to ensure that stackable device ST1 will initially be recognized as the active controller. In the described examples, stackable device ST1 is initially assigned a priority value of '128'. As described in more detail below, the assigned priority values of the other stackable devices capable of joining the stack (e.g., stackable devices ST2-ST3) will eventually be learned by stackable device ST1. If stackable device ST1 determines that any of the other stackable devices has an assigned priority value greater than '128', then stackable device ST1 will issue a command that changes the assigned priority values of these stackable devices to '118' (or another value less than '128'). As a result, stackable device ST1 will initially have the highest assigned priority, such that stackable device ST1 initially becomes the active controller of the stack 100.

The discovery process implements discovery protocol packets, which are exchanged by the various stackable devices ST1-ST3 in a manner described in more detail below. In accordance with one embodiment of the present invention, these discovery protocol packets are used to convey several different messages, including: a 'hello' message, an 'authentication request' message, an 'authentication response' message, an 'authentication successful' message and an 'authentication failed' message.

Figure 2:
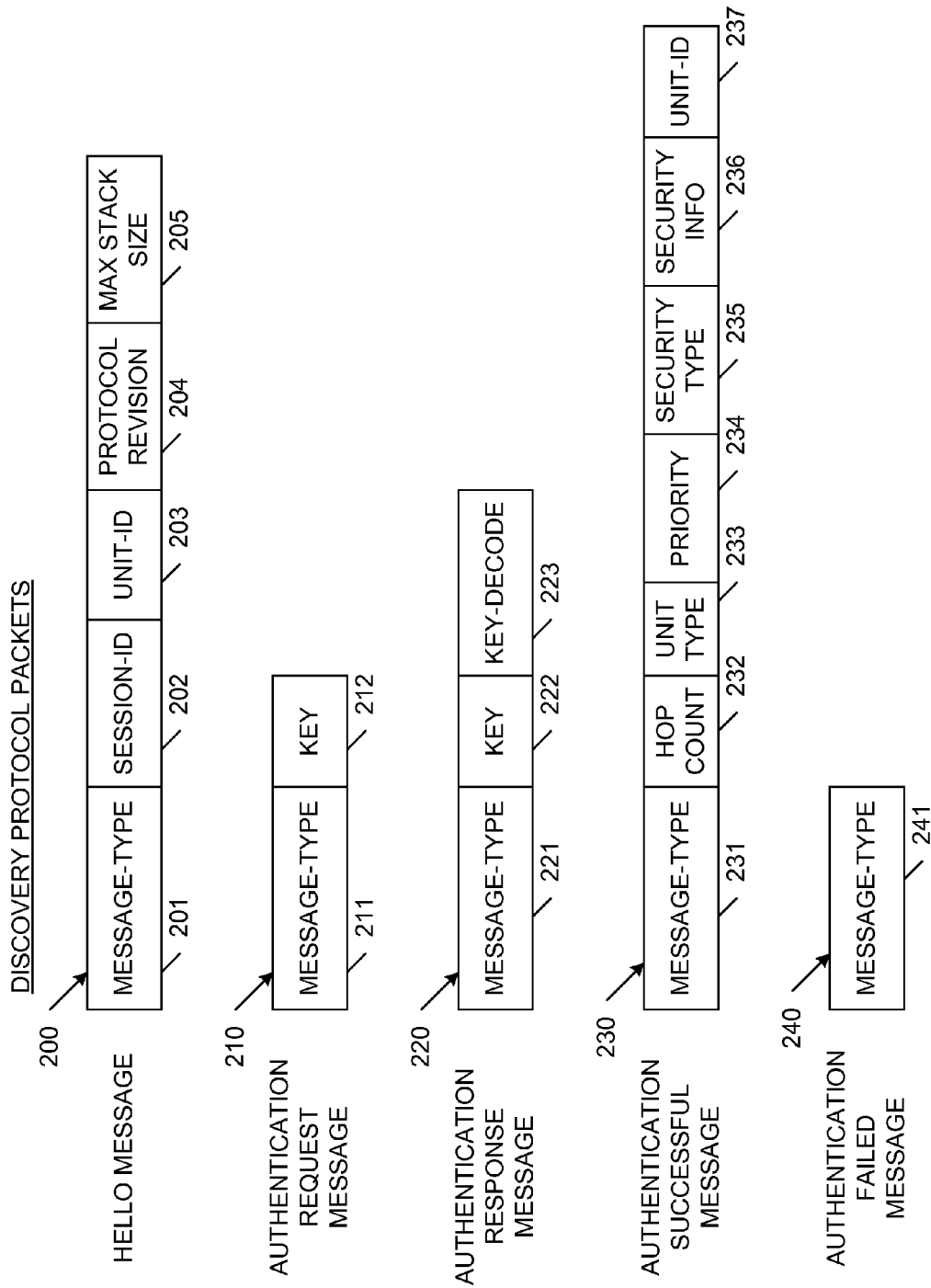
FIG. 2 is a block diagram illustrating relevant fields of discovery protocol request packets used to set up the stack of FIG. 1 in accordance with one embodiment of the present invention.

FIG. 2 is a block diagram that illustrates the relevant fields of the various messages of the discovery protocol, in accordance with one embodiment of the present invention.

The discovery process will now be described in more detail. Upon receiving the 'stack secure setup' command, a stackable device (i.e., active controller) will transmit a 'hello' message on each of the stacking ports (upstream and downstream) of the stackable device. Each 'hello' message transmitted from the originating stackable device will reach a stacking port of a connected stackable device at 1 hop. Each stackable device located at 1 hop responds to the received 'hello' message by performing an authentication process, which is described in more detail below. In general, the authentication process involves the transmission of an 'authentication request' message from the stackable device located at 1 hop, and the return of an 'authentication response' message to the stackable device located at 1 hop. If the authentication process is successful, the stackable device located at 1 hop transmits an 'authentication successful' message to the originating stackable device, wherein this message provides information identifying the stackable device located at 1 hop. If the authentication process is unsuccessful, the stackable device located at 1 hop transmits an 'authentication failed' message to the originating stackable device.

If the authentication process was successful for a stackable device located at 1 hop, then this stackable device forwards the received 'hello' message to the neighboring stackable device (if any) located at 2 hops. The stackable device located at 2 hops performs an authentication process by exchanging 'authentication request' and 'authentication response' messages with the stackable device located at 1 hop. Advantageously, this authentication process does not require the involvement of the originating stackable device (active controller). If this authentication process is successful, the stackable device located at 2 hops transmits an 'authentication successful' message back to the originating stackable device (via the stackable device located at 1 hop), wherein this message provides information identifying the stackable device located at 2 hops.

Note that if the authentication process was unsuccessful for the stackable device located at 1 hop, then this stackable device does not forward the 'hello' message (effectively preventing the discovery of a neighboring stackable device through the stackable device located at 1 hop).

This mechanism continues recursively until each of the 'hello' messages (upstream and downstream) is forwarded up to N times, wherein N is equal to the maximum stack size minus one. In the described examples, the maximum stack size is eight, so each of the 'hello' messages can be forwarded up to seven times from the originating stackable switch. As a result, the discovery process can discover up to seven upstream stackable devices and up to seven downstream stackable devices, in addition to the originating stackable device. Note that if the stack has a ring topology that includes eight stackable devices, the seven discovered upstream stackable devices will be identical to the seven discovered downstream stackable devices. However, if the stack has a linear topology, then up to fourteen different stackable devices may be discovered in addition to the originating stackable device. In this case, the user must select no more than eight of these stackable devices to form the stack. As described in more detail below, the identifying information associated with each of the discovered stackable devices is displayed to the user on the user console 150, thereby enabling the user to select the desired stack members/topology.

The 'stack secure setup' command will now be described in more detail in connection with the stackable devices ST1-ST3 of FIG. 1. Upon receiving the 'stack secure setup' command via CLI logic 131, processor 141 of stackable device ST1 transmits a 'hello' message $HEL_{1U}$ on upstream stacking port $SP_{1U}$ and a 'hello' message $HEL_{1D}$ on downstream stacking port $SP_{1D}$.

FIG. 2 illustrates the relevant fields of a 'hello' message 200, an 'authentication request' message 210, an 'authentication response' message 220, an 'authentication successful' message 230 and an 'authentication failed' message 240.

Each 'hello' message 200 includes a message-type field 201, a session-id field 202, a unit-id field 203, a protocol revision field 204 and a maximum stack size field 205. The message-type field 201 identifies the associated discovery protocol packet as a hello message. The purpose of the 'hello' message is to request information from the neighboring stackable device. The session-id field 202 identifies the discovery process currently being implemented. The unit-id field 203 includes an ID value that identifies the stackable device that originates the 'hello' message (i.e., the stackable device connected to the user console 150). In the described examples, the unit-id field 203 of the 'hello' messages $HEL_{1U}$ and $HEL_{1D}$ will identify stackable device ST1. This unit-id field 203 may include, for example, the model number and/or MAC address of stackable device ST1. In the described examples, stackable device ST1 has a model number of 'FLS648' and a MAC address of '00e0.52ab.cd00'. The stackable device ST1 identified by the unit-id field 203 is initially configured as the active controller of the stack 100. The protocol revision field 204 includes information that identifies the current revision of the discovery protocol being used. The maximum stack size field 205 includes a value that identifies the number of times that the 'hello' message can be forwarded. In the described examples, the maximum stack size field 205 is initially selected to have a value of '7', such that the corresponding 'hello' message can be forwarded up to seven times in either the upstream or downstream direction. As will become apparent in view of the following description, the maximum number of stackable devices in the stack is limited to the initial value stored in the maximum stack size field 205, plus one.

The 'hello' message $HEL_{1U}$ transmitted on stacking port $SP_{1U}$ reaches the stacking port $SP_{2D}$ of stackable device ST2 at 1 hop via stacking link $SL_{12}$. Similarly, the 'hello' message $HEL_{1D}$ transmitted on stacking port $SP_{1D}$ reaches the stacking port $SP_{3U}$ of stackable device ST3 at 1 hop via stacking link $SL_{13}$.

Upon receiving the 'hello' message $HEL_{1U}$ on stacking port $SP_{2D}$, stackable device ST2 determines whether its associated protocol revision information matches the protocol revision information included in the protocol revision field 204 of the received 'hello' message $HEL_{1U}$. Stackable device ST2 may decide to discontinue the discovery process if a match is not detected. In this case, stackable device ST2 returns an 'authentication fail' message $FAIL_{2D}$ to stackable device ST1. Each 'authentication failed' message 240 includes a message-type field 241, which indicates that the authentication process was unsuccessful. If stackable device ST2 returns the 'authentication failed' message $FAIL_{2D}$ to stackable device ST1, then stackable device ST2 will not be allowed to join the stack 100. In addition, stackable device ST2 will not forward the received 'hello' message $HEL_{1U}$, thereby preventing the discovery of upstream stackable devices through stackable device ST2. Stackable device ST3 performs similar operations in response to the 'hello' message $HEL_{1D}$ received on stacking port $SP_{3U}$. The protocol revision information ensures that all members of a stack are configured to implement the same protocol. In the described examples, it is assumed that all of the stackable devices ST1-ST3 implement the same protocol revision.

Thus, upon receiving the 'hello' message $HEL_{1U}$ on stacking port $SP_{2D}$, stackable device ST2 initiates an authentication process, wherein stackable device ST2 determines whether the stackable device ST1 that transmitted the 'hello' message $HEL_{1U}$ is an authentic device (i.e., a stackable device that should be allowed to join a stack that includes stackable device ST2). Similarly, upon receiving the 'hello' message $HEL_{1D}$ on stacking port $SP_{3U}$, stackable device ST3 initiates an identical authentication process.

To initiate the authentication process, a stackable device transmits an 'authentication request' message to the stacking link on which the corresponding 'hello' message was received. Thus, stackable device ST2 transmits an 'authentication request' message $REQ_{2D}$ to stackable device ST1 via stacking link $SL_{12}$. Similarly, stackable device ST3 transmits an 'authentication request' message $REQ_{3U}$ to stackable device ST1 via stacking link $SL_{13}$. Each 'authentication request' message 210 is a discovery protocol packet that includes message-type field 211 and key field 212 (FIG. 2). The message-type field 211 stores a value that identifies the associated discovery protocol packet as an 'authentication request' message. The key field 212 stores a key value that is to be decoded by the stackable device receiving the 'authentication request' message. In the present example, 'authentication request' message REQ$_{2D}$ includes a first key value KEY$_1$, and 'authentication request' message REQ$_{3U}$ includes a second key value KEY$_2$.

In response to receiving an 'authentication request' message, a stackable device will generate a decoded key value in response to the key value included in the 'authentication request' message. Thus, stackable device ST1 generates a first decoded key value DKEY$_1$ in response to the key value KEY$_1$ included in the received 'authentication request' message REQ$_{2D}$. Stackable device ST1 also generates a second decoded key value DKEY$_2$ in response to the key value KEY$_2$ included in the received 'authentication request' message REQ$_{3U}$.

Stackable device ST1 then returns the decoded key values to the stackable devices that originated the 'authentication request' messages. More specifically, stackable device ST1 generates 'authentication response' messages REP$_{1U}$ and REP$_{1D}$, which are transmitted to stackable devices ST2 and ST3, respectively. Each 'authentication response' message 220 is a discovery protocol packet that includes message-type field 221, key field 222 and key-decode field 223 (FIG. 2). The message-type field 221 stores a value that identifies the associated discovery protocol packet as an 'authentication response' message. The key field 222 stores the key value that was originally received in the corresponding 'authentication request' message. The key-decode field 223 includes the decoded key value that was generated in response to the key value of key field 222. Thus, stackable device ST1 provides an 'authentication response' message REP$_{1U}$ to stackable device ST2, wherein this message REP$_{1U}$ includes the key value KEY$_1$ of the 'authentication request' message REQ$_{2D}$ and the corresponding decoded key value DKEY$_1$. Stackable device ST1 also provides an 'authentication response message REP$_{1D}$ to stackable device ST3, wherein this message REP$_{1D}$ includes the key value KEY$_2$ of the 'authentication request' message REQ$_{3U}$ and the corresponding decoded key value DKEY$_2$.

Upon receiving an 'authentication response' message, a stackable device will determine whether the authentication process was a success or a failure. To accomplish this, the stackable device receiving the 'authentication response' message independently generates a decoded key value in response to the original key value. For example, upon receiving the authentication response message REP$_{1U}$, stackable device ST2 independently generates a decoded key value DKEY$_1$' in response to the original key value KEY$_1$. If this independently generated decoded key value DKEY$_1$' matches the decoded key value DKEY$_1$ included in the 'authentication response' message REP$_{1U}$, then the authentication process is successful. Otherwise, the authentication process has failed. Note that both stackable devices must implement the same key decoding algorithm in order for the authentication process to be successful. Unauthorized stackable devices will not implement the same key decoding algorithms as authentic stackable devices, thereby preventing the authentication of unauthorized stackable devices.

If a stackable device determines that the authentication process has failed because the decoded key values do not match, then this stackable device returns an 'authentication failed' message to the neighboring stackable device that originally transmitted the 'hello' message. For example, upon determining that the authentication process has failed, stackable device ST2 will transmit an 'authentication failed' message FAIL$_{2D}$ to stackable device ST1. Similarly, upon determining that the authentication process has failed, stackable device ST3 will transmit an 'authentication failed' message FAIL$_{3U}$ to stackable device ST1. In response to receiving the FAIL$_{2D}$ message or the FAIL$_{3U}$ message, stackable device ST1 will not allow the corresponding stackable device ST2 or ST3 to join the stack. In addition, if the authentication process has failed within a stackable device, then this stackable device will not forward the received 'hello' message. For example, if authentication fails within stackable device ST2, then stackable device ST2 will not forward the received 'hello' message HEL$_{1U}$ on its upstream stacking port SP$_{2U}$, thereby preventing the discovery of upstream stackable devices through stackable device ST2. Similarly, if authentication fails within stackable device ST3, then stackable device ST3 will not forward the received 'hello' message HEL$_{1D}$ on its downstream stacking port SP$_{3D}$, thereby preventing the discovery of downstream stackable devices through stackable device ST3. However, in the described examples, it is assumed that the authentication process is successful in both of stackable devices ST2 and ST3.

A stackable device that determines that the authentication process was successful returns an 'authentication successful' message to the neighboring stackable device that originally transmitted the 'hello' message. For example, upon determining that the authentication process was successful, stackable devices ST2 and ST3 transmit 'authentication successful' messages SUCC$_{2D}$ and SUCC$_{3U}$, respectively, to stackable device ST1.

In accordance with one embodiment, the successful authentication of a stackable device will expire after a predetermined period (e.g. 1 minute) of inactivity. Thus, the 'authentication successful' message must be sent before the predetermined period expires. In the case that the predetermined period expires, the 'stack secure setup' command must be reissued to allow the stackable device to join the stack.

Each 'authentication successful' message 230 is a discovery protocol packet that includes message-type field 231, hop-count field 232, unit-type field 233, priority field 234, security type field 235, security information field 236 and unit-id field 237 (FIG. 2). The message-type field 231 stores a value that identifies the associated discovery protocol packet as an 'authentication successful' message. The hop count field 232 indicates the number of hops that the 'authentication successful' message has traveled. The stackable device that originally generates the 'authentication successful' message sets the hop count field 232 to a value of '1'. Thus, when stackable device ST1 receives the 'authentication successful' message SUCC$_{2D}$ that originates in stackable device ST2, or the 'authentication successful' message SUCC$_{3U}$ that originates in stackable device ST3, the hop count field 232 will have a value of '1'. If a stackable device that is not the active controller receives an 'authentication successful' message on one of its stacking ports, this stackable device will add '1' to the value stored in the hop count field 232, and then forward the modified 'authentication successful' message to its other stacking port. As a result, when an 'authentication successful' message is received by the active controller (i.e., stackable device ST1), the hop count field 232 indicates the number of hops that exist between the stackable device that originated the 'authentication successful' message and the active controller. The value stored in the hop count field 232 is limited to the value initially stored in the maximum stack size field 205 of 'hello' message 200. (e.g., 7).

The unit type field 233 includes information that identifies the type (e.g., model number) of the stackable device that originally generates the 'authentication successful' message. In the described examples, stackable device ST2 has a unit type of 'FLS624' and stackable device ST3 has a unit type of 'FGS624'. Note that stack 100 may support multiple different unit types.

The priority field 234 includes a priority value that specifies an assigned priority of the stackable device that originally generates the 'authentication successful' message. In the described examples, the stackable devices ST2 and ST3 have assigned priority values of '0', although this is not necessary. As described above, if the assigned priority values of the stackable devices ST2 and ST3 are greater than the assigned priority value of stackable device ST1 (active controller), the stackable devices ST2 and ST3 will be re-assigned lower priority values.

The security type field 235 and the security information field 236 support further authentication, which may be required by stackable devices other than the active controller. The security type field 235 identifies a 'type' of security information included in the security information field 236. The security information field 236 includes the actual security information required to access the stackable device that originates the 'authentication successful' message. For example, the security type field 235 of 'authentication successful' message $SUCC_{2D}$ may indicate that a password is required in order to access stackable device ST2. In this case, the security information field 236 of 'authentication successful' message $SUCC_{2D}$ includes the (encrypted) password required to access stackable device ST2. In response to receiving the 'authentication successful' message $SUCC_{2D}$, stackable device ST1 decrypts the encrypted password, and requests that the user enter the password required to access stackable device ST2 via the user console 150. If the user properly enters the required password, then stackable device ST1 will allow the password-protected stackable device ST2 to join the stack 100. However, if the user does not enter the correct password, stackable device ST1 will not allow stackable device ST2 to join the stack 100. As described in more detail below, if one stackable device is not allowed to join the stack, this may prevent other stackable devices from joining the stack. Advantageously, the user does not have to connect the user console 150 to stackable device ST2 in order to enter the required password. As a result, the configuration of the stack 100 is simplified.

The unit-id field 237 includes a value, such as a MAC address, that identifies the stackable device that originates the 'authentication successful' message. In the described examples, the unit-id field 237 of 'authentication successful' message $SUCC_{2D}$ has a value of 0012.f239.2d40 (the MAC address of stackable device ST2), and the unit-id field 237 of 'authentication successful' message $SUCC_{3U}$ has a value of 0012.f2d5.2100 (the MAC address of stackable device ST3).

Upon receiving the 'authentication successful' messages $SUCC_{2D}$ and $SUCC_{3U}$ (and receiving any required security information from the user), the stackable device ST1 (active controller) stores the associated information (i.e., hop-count, unit-type, priority, security type, security info and unit-id) in a connectivity database.

If a stackable device generates an 'authentication successful' message in response to a 'hello' message received on a first stacking port of the stackable device, then this stackable device will determine whether the value stored in the maximum stack size field 205 of this received 'hello message' has a positive value. If so, then this stackable device will decrement the value stored in the maximum stack size field 205 of this 'hello' message by one, and forward the modified 'hello' message onto the second stacking port of the stackable device.

In the example of FIG. 1, stackable device ST2 determines that the value stored in the maximum stack size field 205 of the received 'hello' message $HEL_{1U}$ has a positive value (i.e., '7'). In response, stackable device ST2 decrements this value by one, such that the maximum stack size field 205 of the 'hello' message $HEL_{1U}$ stores a value of '6'. Stackable device then forwards this modified 'hello' message $HEL_{1U}$ to stackable device ST3 (via stacking port $SP_{2U}$, stacking link $SL_{23}$ and stacking port $SP_{3D}$). In response, stackable device ST3 performs initiates the authentication process described above, wherein stackable device ST3 transmits an 'authentication request' message $REQ_{3D}$ to stackable device ST2, stackable device ST2 returns an 'authentication response' message $REP_{2U}$ to stackable device ST3, and stackable device ST3 determines whether the authentication process was successful or failed. If the authentication is successful, stackable device ST3 generates an 'authentication successful' message $SUCC_{3D}$ in the manner described above. This 'authentication successful' message is transmitted to stackable device ST2 (via stacking port $SP_{3D}$, stacking link $SL_{23}$ and stacking port $SP_{2U}$). Stackable device ST2 adds '1' to the hop count field 232 of this 'authentication successful' message $SUCC_{3D}$, such that this hop count field 232 is modified to have a value of '2'. Stackable device ST2 then transmits the modified 'authentication successful' message $SUCC_{3D}$ to stackable device ST1 (via stacking port $SP_{2D}$, stacking link $SL_{12}$ and stacking port $SP_{1U}$). Note that the 'authentication successful' message received by stackable device ST1 properly indicates that stackable device ST3 is 2 hops from stackable device ST1 in the upstream direction. Stackable device ST1 stores the information included in 'authentication successful' message $SUCC_{3D}$ in the connectivity database.

If the authentication fails, then stackable device ST3 generates an 'authentication failed' message $FAIL_{3D}$ in the manner described above. This 'authentication failed' message is transmitted to stackable device ST2 (via stacking port $SP_{3D}$, stacking link $SL_{23}$ and stacking port $SP_{2U}$). In response, stackable device ST2 does not allow stackable device ST3 to join the stack 100 via stacking link $SL_{23}$.

In a similar manner, stackable device ST3 modifies the maximum stack size field 205 of the 'hello' message $HEL_{1D}$ to store a value of '6', and then forwards this modified 'hello' message $HEL_{1D}$ upstream to stackable device ST2 (via stacking port $SP_{3D}$, stacking link $SL_{23}$ and stacking port $SP_{2U}$). In response, stackable device ST2 initiates the authentication process described above, wherein stackable device ST2 transmits an 'authentication request' message $REQ_{2U}$ to stackable device ST3, stackable device ST3 returns an 'authentication response' message $REP_{3D}$ to stackable device ST2, and stackable device ST2 determines whether the authentication process was successful or failed. If the authentication is successful, stackable device ST2 generates an 'authentication successful' message $SUCC_{2U}$ in the manner described above. This 'authentication successful' message $SUCC_{2U}$ is transmitted to stackable device ST3 (via stacking port $SP_{2U}$, stacking link $SL_{23}$ and stacking port $SP_{3D}$). Stackable device ST3 adds '1' to the hop count field 232 of this 'authentication successful' message $SUCC_{2U}$, such that this hop count field 232 is modified to have a value of '2'. Stackable device ST3 then transmits the modified 'authentication successful' message $SUCC_{2U}$ to stackable device ST1 (via stacking port $SP_{3U}$, stacking link $SL_{13}$ and stacking port $SP_{1D}$). Note that the 'authentication successful' message $SUCC_{2U}$ received by stackable device ST1 properly indicates that stackable device ST2 is 2 hops from stackable device ST1 in the downstream direction. Stackable device ST1 stores the information included in 'authentication successful' message $SUCC_{2U}$ in the connectivity database.

If the authentication fails, then stackable device ST2 generates an 'authentication failed' message $FAIL_{2U}$ in the manner described above. This 'authentication failed' message $FAIL_{2U}$ is transmitted to stackable device ST3 (via stacking port $SP_{2U}$, stacking link $SL_{23}$ and stacking port $SP_{3D}$). In response, stackable device ST3 does not allow stackable device ST2 to join the stack 100 via stacking link $SL_{23}$.

In the manner described above, the authentication process is performed between two neighboring stackable devices, and therefore does not always require the participation of the active controller.

Continuing with the example of FIG. 1, it will be assumed that the authentication processes performed between stackable devices ST2 and ST3 are successful. In this case, stackable device ST3 determines that the maximum stack size field 205 of the received 'hello' message $HEL_{1U}$ stores a positive value (i.e., '6'). In response, stackable device ST3 decrements this value by one, such that the maximum stack size field 205 of the 'hello' message $HEL_{1U}$ stores a value of '5'. Stackable device ST3 then forwards this modified 'hello' message $HEL_{1U}$ to stackable device ST1 (via stacking port $SP_{3U}$, stacking link $SL_{13}$ and stacking port $SP_{1D}$).

Similarly, stackable device ST2 determines that the maximum stack size field 205 of the received 'hello' message $HEL_{1D}$ stores a positive value (i.e., '6'). In response, stackable device ST2 decrements this value by one, such that the maximum stack size field 205 of the 'hello' message $HEL_{1D}$ stores a value of '5'. Stackable device ST2 then forwards this modified 'hello' message $HEL_{1U}$ to stackable device ST1 (via stacking port $SP_{2D}$, stacking link $SL_{12}$ and stacking port $SP_{1U}$).

Upon receiving the 'hello' messages $HEL_{1U}$ and $HEL_{1D}$, stackable device ST1 determines that it originated these 'hello' messages $HEL_{1U}$ and $HEL_{1D}$ from the value stored in the unit-id field 203. In response, stackable device ST1 determines that the stack 100 has a ring topology, and modifies the connectivity database to reflect this fact. Note that if the stack 100 were connected in a linear topology, stackable device ST1 would not receive the 'hello' messages $HEL_{1U}$ and $HEL_{1D}$, as there would be no return path for these messages.

Note that after a 'hello' message has been forwarded seven times, the maximum stack size field 205 of this 'hello' message will have a value of '0'. If a stackable device receives a 'hello' message with a maximum stack size field 205 having a value of '0', this stackable device will neither respond to nor forward this 'hello' message, because it is not possible that any stackable device receiving the 'hello' message could be added to the stack without exceeding the maximum stack size. Note that if the maximum number of stackable devices (e.g., 8) are connected in a ring topology, then the stackable device ST1 will receive 'hello' messages $HEL_{1U}$ and $HEL_{1D}$ having maximum stack size fields 205 that store values of '0'. In this case, the stackable device ST1 may use these received 'hello' messages $HEL_{1U}$ and $HEL_{1D}$ to determine that the stack is connected in a ring topology.

Note that if more than eight stackable devices are connected in a ring, or if more than eight stackable devices are connected upstream or downstream of stackable device ST1 in a linear topology, then the maximum stack size field 205 of the forwarded 'hello' message(s) will be reduced to '0' after being forwarded seven times.

In the manner described above, stackable device ST1 develops a connectivity database for all possible members of the stack in response to the 'stack secure setup' command. Stackable device ST1 presents this connectivity database to the user via user console 150. In accordance with the embodiment illustrated by FIG. 1, the user console 150 displays the following information. Note that the possible members of the stack are presented in both the upstream and downstream directions, with respect to stackable device ST1.

| Display 1 | | |
|---|---|---|
| Current Discovered Topology - RING | | |
| Hop(s) | Type | MAC address |
| Available UPSTREAM Units | | |
| 1 | FLS624 | 0012.f239.2d40 |
| 2 | FGS624 | 0012.f2d5.2100 |
| Available DOWNSTREAM Units | | |
| 1 | FGS624 | 0012.f2d5.2100 |
| 2 | FLS624 | 0012.f239.2d40 |

Do you accept the topology (RING) (y/n)?

Note that the user console 150 prompts the user to accept (or reject) the ring topology. If the user accepts the ring topology, then stackable device ST1 will assign stack ID values (Id) to each of the stackable devices ST1-ST3, and cause the user console 150 to display the assigned stack ID values as follows.

| Display 2 | | | |
|---|---|---|---|
| Selected Topology | | | |
| | Id | Type | MAC address |
| Active | 1 | FLS648 | 00e0.52ab.cd00 |
| Hop(s) | Id | Type | MAC address |
| Selected UPSTREAM Units | | | |
| 1 | 3 | FLS624 | 0012.f239.2d40 |
| 2 | 2 | FGS624 | 0012.f2d5.2100 |
| Selected DOWNSTREAM Units | | | |
| 1 | 2 | FGS624 | 012.f2d5.2100 |
| 2 | 3 | FLS624 | 0012.f239.2d40 |

Do you accept the unit id's (y/n)?

Note that stackable device ST1, which is the active controller, is assigned a stack ID value of '1'. Stackable devices ST2 and ST3 are assigned stack ID values of '3' and '2', respectively. In one embodiment, stackable device ST1 assigns consecutive stack ID values in the upstream direction for a ring topology.

The user console 150 prompts the user to accept (or reject) the assigned stack ID values. If the user accepts the assigned stack ID values, then the secure setup of stack 100 is complete.

If the user rejects the assigned stack ID values, then stackable switch ST1 asks the user (via user console 150) to assign the desired stack ID values, one by one, to the stackable devices ST1-ST3. The user can select any number between 1 and the maximum allowed stack ID value (e.g., 8). A duplicate number for a stack ID value can't be selected as all the members of the stack need to have distinct stack ID values. In one embodiment, the following is displayed on the user console 150, wherein the bold numbers represent the user's input required to change the stack ID value of stackable device ST2 to '2' and the stack ID value of stackable device ST3 to '3'.

Display 3

Enter an unused id for the UPSTREAM FLS624 unit at 1 hop(s) (1-8) [3]: 2
Enter an unused id for the UPSTREAM FGS624 unit at 2 hop(s) (1-8) [2]: 3

When the user is done assigning the desired stack ID values, the secure setup of stack 100 is complete.

Note that the user rejects the ring topology in response to the query provided in Display 1 above. In this case, the active controller ST1 will prompt the user to select the desired topology from the upstream and downstream devices in the connectivity database. In the example of FIG. 1, user console 150 will display the following if the user rejects the ring topology.

Display 4
Do you accept the topology (RING) (y/n): n

| Hop(s) | Type | MAC address |
|---|---|---|
| | Available UPSTREAM Units | |
| 1 | FLS624 | 0012.f239.2d40 |
| 2 | FGS624 | 0012.f2d5.2100 |
| | Available DOWNSTREAM Units | |
| 1 | FGS624 | 0012.f2d5.2100 |
| 2 | FLS624 | 0012.f239.2d40 |

Enter the number of desired UPSTREAM units (0-2)[0]: 1
Enter the number of desired DOWNSTREAM units (0-2)[0]: 1

In the illustrated example, the user selects one upstream unit (i.e., stackable device ST2) and one downstream unit (i.e., stackable device ST3). However, the user could alternately select two upstream units and zero downstream units, two downstream units and zero upstream units, one upstream unit and zero downstream units, or one downstream unit and zero upstream units. In any of these alternatives, the stack will have a linear topology. In response to the entries illustrated by Display 4, the active controller ST1 will cause the following to be displayed by user console 150.

Display 5
Selected topology:

| | Id | Type | MAC address |
|---|---|---|---|
| Active | 1 | FLS648 | 00e0.52ab.cd00 |
| Hop(s) | Id | Type | MAC address |
| | Selected UPSTREAM units | | |
| 1 | 2 | FLS624 | 0012.f239.2d40 |
| | Selected DOWNSTREAM units | | |
| 1 | 3 | FGS624 | 0012.f2d5.2100 |

Do you accept the unit ID's (y/n):

The user can accept the unit ID's or modify the unit ID's in the manner described above in connection with Display 3.

The user can view the stack topology by entering a 'show stack' command via user console 150. The following information is shown by the user console 150 in response to the 'show stack' command. This example assumes that the user accepted the ring topology in Display 1 above, and also accepted the automatically assigned stack ID values in Display 2 above. Note that the stackable device ST1 has randomly assigned the role of standby controller to stackable device ST2 in this example (as both stackable devices ST2 and ST3 have the same priority of '0').

Display 6

| Id | Type | Role | MAC address | Pri | State | Comment |
|---|---|---|---|---|---|---|
| 1 | S FLS648 | active | 00e0.52ab.cd00 | 128 | local | Ready |
| 2 | S FGS624 | standby | 0012.f2d5.2100 | 0 | remote | Ready |
| 3 | S FLS624 | member | 0012.f239.2d40 | 0 | remote | Ready |

Alone: standalone,
D: dynamic config,
S: static config

The priority of each of the stackable devices ST1-ST3 can be modified by a 'priority' command, which is entered via user console 150. Each priority command specifies the unit ID of the stackable device and the desired priority value of the stackable device. The stackable device having the highest assigned priority will become the active controller of the stack, and the stackable device having the next highest assigned priority will become the standby controller of the stack.

After the secure setup of stack 100 is complete, the user enters a 'write memory' command via the user console 150. In response, stackable device ST1 initiates configuration synchronization, which copies the configuration database from stackable device ST1 to the rest of the stackable devices ST2-ST3 in the stack. At this time, stackable devices ST1, ST2 and ST3 display their assigned stack ID values (e.g., '1', '3' and '2', respectively) on their associated LED displays 121, 122 and 123, respectively. As a result, the user can readily determine the stack ID values assigned to stackable devices ST1-ST3, simply by looking at the LED displays 121-123.

A synchronized copy of the startup configuration file of stackable device ST1 (i.e., the active controller) is also stored in stackable device ST2 (i.e., the standby controller), for use in the event that stackable device ST1 fails. If stackable device ST1 fails, stackable device ST2 waits a default interval of 30 seconds, then takes over as the active controller.

When the stack 100 is formed, the console function for each stack member (e.g. stackable devices ST2 and ST3) is automatically redirected to the active controller (e.g., stackable device ST1). The active controller handles all stack management functions. If the user erroneously connects the user console 150 to a stack member that is not the active controller, the user is instructed to re-connect the user console 150 to the active controller (e.g., the user console 150 may display a message such as "reconnect user console to stack ID unit no. 1").

The stack 100 is identified in an associated network by a single MAC address (e.g., the MAC address of the active controller). If a new active controller is elected, the MAC address of the new active controller becomes the MAC address for the entire stack 100.

A new stackable device can be added to stack 100 in the following manner. The stackable devices ST1-ST3 of stack 100 are powered down, and the new stackable device is connected to the stack 100 in the desired configuration, by connecting stacking links to the various stacking ports in the manner described above. The secure setup process is performed in the manner described above, whereby a stack topology is selected and stack ID values are assigned. During this process, the active controller will reset the new stackable device. After the new stackable device boots and joins the stack, the user issues a 'write memory' command through the user console, thereby finalizing the new stack.

Figure 3:
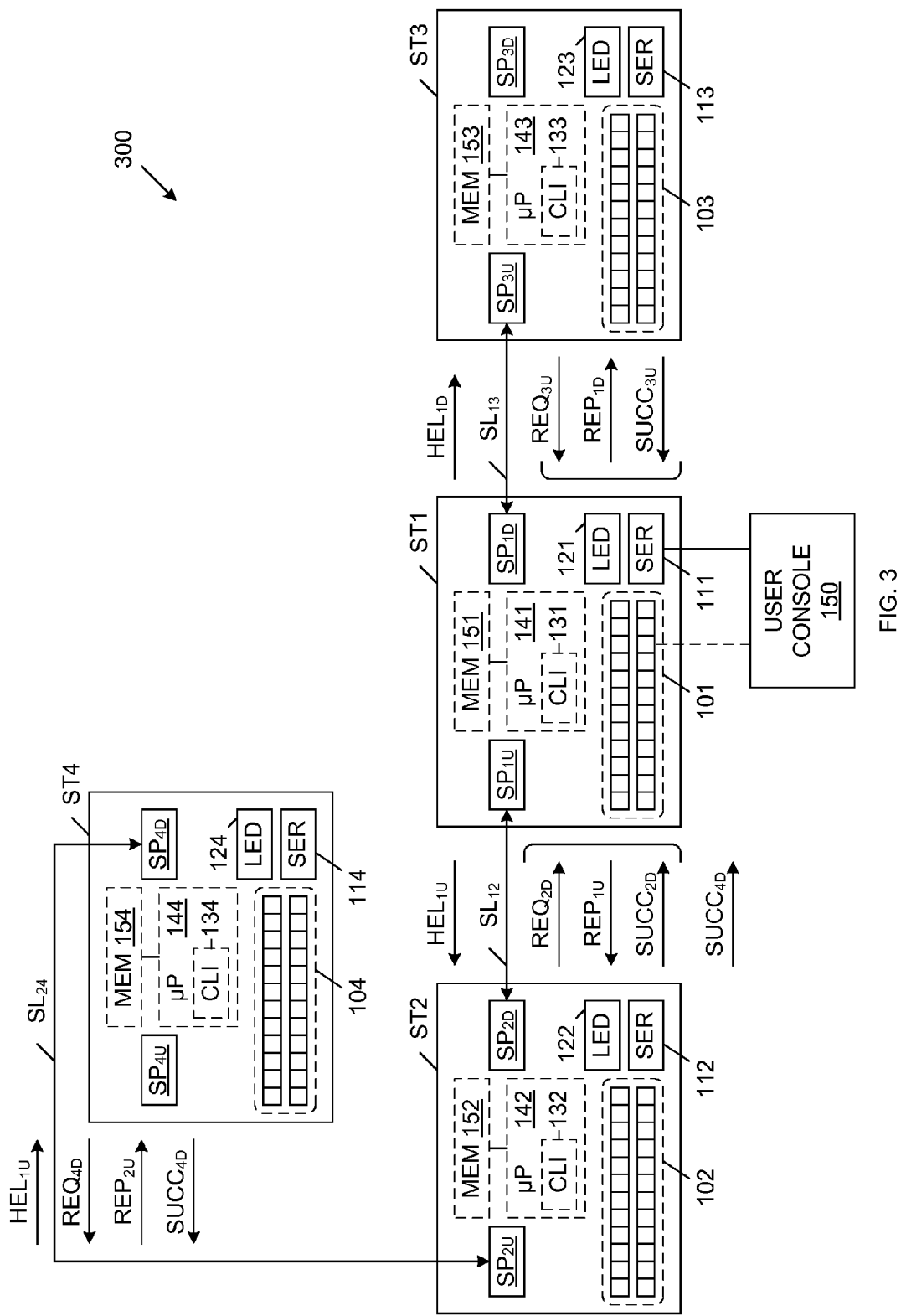
FIG. 3 is a block diagram of a stack that includes four stackable devices, which are configured in a linear topology in accordance with one embodiment of the present invention.

FIG. 3 is a block diagram of a stack 300 that includes the stackable devices ST1, ST2, ST3 and ST4 configured in a linear topology in accordance with one embodiment of the present invention. Because stack 300 is similar to stack 100, similar elements in FIGS. 1 and 3 are labeled with similar reference numbers. Thus, stack 300 includes stackable devices ST1, ST2 and ST3, stacking links $SL_{12}$ and $SL_{13}$, and user console 150, which have been described above in connection with FIG. 1. The serial link $SL_{23}$ of stack 100 is eliminated in stack 300. Within stack 300, the stacking port $SP_{2U}$ of stackable device ST2 is coupled to the stacking port $SP_{4D}$ of stackable device ST4 by stacking link $SL_{24}$.

When the user issues the 'stack secure setup' command on user console 150, stackable device ST1 transmits the 'hello' messages $HEL_{1U}$ and $HEL_{1D}$ on stacking ports $SP_{1U}$ and $SP_{1D}$, respectively, in the manner described above. In response, stackable devices ST2 and ST3 initiate the authentication process in the manner described above. In the present example, it is assumed that the authentication process is successful and all necessary security information is entered properly. Note that stackable device ST3 does not forward the 'hello' message $HEL_{1D}$ to stacking port $SP_{3D}$, because this stacking port $SP_{3D}$ is not connected to a stacking link.

Stackable device ST2 decrements the maximum stack size field 205 of the 'hello' message $HEL_{1U}$ by one, and then forwards this modified 'hello' message $HEL_{1U}$ to stackable device ST4 (via stacking port $SP_{2U}$, stacking link $SL_{24}$ and stacking port $SP_{4D}$). In response, stackable device ST4 initiates the authentication process in the manner described above. In the present example, it is assumed that the authentication process is successful. As a result, an 'authentication successful' message $SUCC_{4D}$ is transmitted from stackable device ST4 to stackable device ST1 (through stackable device ST2). In the present example, this 'authentication successful' message $SUCC_{4D}$ includes a hop count field 232 having a value of '2', a unit type field 233 having a value of 'FGS624' (which is the model number of stackable device ST4), and a unit-id field 237 having a value of 0012.f2d2.2200 (which is the MAC address of stackable device ST4). It is further assumed that all necessary security information (if any) associated with stackable device ST4 is entered properly.

After the above-described discovery process is complete, stackable device ST1 will present the following connectivity database to the user via user console 150. Note that stackable device ST1 does not assume a ring topology, because stackable device ST1 did not receive the 'hello' messages $HEL_{1U}$ and $HEL_{1D}$, and different stackable devices are available in the upstream and downstream directions.

Display 7
Current Discovered Topology

| Hop(s) | Type | MAC address |
|---|---|---|
| Available UPSTREAM Units | | |
| 1 | FLS624 | 0012.f239.2d40 |
| 2 | FGS624 | 0012.f2d2.2200 |
| Available DOWNSTREAM Units | | |
| 1 | FGS624 | 0012.f2d5.2100 |

Enter the number of desired UPSTREAM units [1-2]: 2
Enter the number of desired DOWNSTREAM units [0-1]: 1

Note that the user console 150 prompts the user to select the number of upstream and downstream stackable devices to be included in the stack 300. As indicated by the bold entries in Display 7 above, the user selects the upstream stackable devices ST2 and ST4, and the downstream stackable device ST3 to join the stack 300 (although this is not necessary). In response, stackable device ST1 assigns stack ID values (Id) to each of the stackable devices ST1-ST4, and causes the user console 150 to display the assigned stack ID values as follows.

Display 8
Selected Topology

| | Id | Type | MAC address |
|---|---|---|---|
| Active | 1 | FLS648 | 00e0.52ab.cd00 |
| Hop(s) | Id | Type | MAC address |
| Selected UPSTREAM Units | | | |
| 1 | 2 | FLS624 | 0012.f239.2d40 |
| 2 | 4 | FGS624 | 0012.f2d2.2200 |
| Selected DOWNSTREAM Units | | | |
| 1 | 3 | FGS624 | 012.f2d5.2100 |

Do you accept the unit id's (y/n)?

The user console 150 prompts the user to accept (or reject) the assigned stack ID values. If the user accepts the assigned stack ID values, then the secure setup of stack 100 is complete.

If the user rejects the assigned stack ID values, then stackable switch ST1 asks the user (via user console 150) to assign the desired stack ID values, one by one, to the stackable devices ST1-ST3. The user can select any number between 1 and the maximum allowed stack ID value (e.g., 8). A duplicate number for a stack ID value can't be selected as all the members of the stack need to have distinct stack ID values. In one embodiment, the following is displayed on the user console 150, wherein the bold numbers represent the user's input required to change the stack ID values of stackable devices ST2, ST3 and ST4 to '3', '2' and '4', respectively.

Display 9

Enter an unused id for the UPSTREAM FLS624 unit at 1 hop(s) (1-8) [2]: 3
Enter an unused id for the UPSTREAM FGS624 unit at 2 hop(s) (1-8) [4]: 4
Enter an unused id for the DOWNSTREAM FGS624 unit at 1 hop(s) (1-8) [3]: 2

When the user is done assigning the desired stack ID values, the user may issue the 'show stack' command to view the stack on user console 150.

| Display 10 | | | | | | |
|---|---|---|---|---|---|---|
| Id | Type | Role | MAC address | Pri | State | Comment |
| 1 | S FLS648 | active | 00e0.52ab.cd00 | 128 | local | Ready |
| 2 | S FGS624 | standby | 0012.f2d5.2100 | 0 | remote | Ready |
| 3 | S FLS624 | member | 0012.f239.2d40 | 0 | remote | Ready |
| 4 | S FGS624 | member | 0012.f2d2.2200 | 0 | remote | Ready |

Alone: standalone,
D: dynamic config,
S: static config

The user may then issue the 'write memory' command to store the stack configuration database in each of the stackable devices ST1-ST4.

Note that if stackable device ST2 required a password, and the user was unable to provide this password, then stackable device ST2 would not be included in the connectivity database. In this case, stackable device ST2 cannot be added to the stack 300. If a stackable device is removed from the connectivity database, all the stackable devices that can only be accessed through this stackable device are also removed from the connectivity database. Thus, in the described example, stackable device ST4 would not be included in the connectivity database, and would not be allowed to join the stack 300, if the user does not provide the password required by stackable device ST2.

Note that the user is unable to provide a password required by stackable device ST2 in the ring topology illustrated by FIG. 1, then stackable device ST2 would not be allowed to join the stack, thereby preventing the formation of a stack having a ring topology. However, the user would be presented the option of configuring a stack having a linear topology, which includes only stackable devices ST1 and ST3.

If a 'hello' message is received by a stackable device that is already a member of another stack (as indicated by the configuration database stored by the stackable device), further discovery is terminated (i.e., the stackable device belonging to another stack does not respond to the received 'hello' message, and does not forward the received 'hello' message).

The present invention provides a unique way to manage a stack formed of a plurality of stackable devices. Advantageously, the user doesn't have to individually access each of the plurality of stackable devices in order to configure the stack. Because the user can configure the stack through a single stackable device, significant time and effort is saved.

Moreover, the user can obtain a complete view of the stack by accessing a single stackable device. The user can thereby obtain a complete view of switchable devices that are available to join the stack, and can select which of the switchable devices join the stack.

In addition, the user can select the active controller and stack topology by accessing a single stackable device. The single stackable device that is accessed automatically becomes the active controller of the stack, and hence no configuration is needed to select the active controller. Also the discovery process presents all the discovered stackable devices in the network, and allows the user to select the total number of stackable devices in upstream and downstream directions as well as the stack topology.

Although the present invention has been described in connection with various embodiments, it is understood that variations of these embodiments would be obvious to one of ordinary skill in the art. Thus, the present invention is limited only by the following claims.

I claim:

1. A method comprising:
   receiving a user-initiated stack setup command on a console port of a first stackable device from a user console connected to said console port;
   establishing a stack with the first stackable device in response to the stack setup command;
   in response to receiving the stack setup command, designating the first stackable device as a master of the stack and assigning a numerical priority value to the first stackable device; and
   upon receipt from another stackable device that said other stackable device has a higher numerical priority value than the numerical priority value assigned to the first stackable device, transmitting a message by the first stackable device to such other stackable device to thereby force the numerical priority value of the other stackable device to be changed to be less than the assigned numerical priority value of the first stackable device.

2. The method of claim 1, further comprising transmitting information identifying a topology of the stack through the console port of the first stackable device.

3. The method of claim 1, wherein the step of establishing the stack comprises initiating a discovery process with the first stackable device in response to the stack setup command, wherein a discovery message is transmitted on a first stacking port of the first stackable device.

4. The method of claim 1, wherein the step of establishing the stack further comprises receiving a response message on a first stacking port of the first stackable device, wherein the response message includes identifying information of a second stackable device coupled to the first stacking port.

5. The method of claim 4, further comprising transmitting the identifying information of the second stackable device through the console port of the first stackable device.

6. The method of claim 1, wherein the step of establishing the stack further comprises transmitting an authentication message on a first stacking port of the first stackable device.

7. A method comprising:
   receiving a user-initiated stack setup command on a console port of a first stackable device from a user console connected to said console port;
   designating the first stackable device as a master of a stack in response to receiving the stack setup command;
   initiating a discovery process with the first stackable device in response to the stack setup command, wherein a discovery message is transmitted on a first stacking port of the first stackable device;
   receiving a response message on the first stacking port, wherein the response message includes identifying information of a second stackable device coupled to the first stacking port; and
   transmitting the identifying information of the second stackable device from the first stackable device through the console port to the user console; and
   upon receipt from another stackable device that said other stackable device has a higher numerical priority value than the numerical priority value assigned to the first stackable device, transmitting a message by the first stackable device to such other stackable device to thereby force the numerical priority value of the other stackable device to be changed to be less than the assigned numerical priority value of the first stackable device.

8. The method of claim 7, further comprising establishing the stack with the first stackable device in response to the identifying information of the second stackable device.

9. The method of claim 7, wherein the step of initiating the discovery process further comprises transmitting a second discovery message on a second stacking port of the first stackable device.

10. The method of claim 9, further comprising:
receiving a second response message on the second stacking port, wherein the second response message includes identifying information of a third stackable device coupled to the second stacking port; and
transmitting the identifying information of the third stackable device through the console port of the first stackable device.

11. The method of claim 9, further comprising receiving a second response message on the second stacking port, wherein the second response message includes identifying information of the second stackable device.

12. The method of claim 11, further comprising transmitting topology information through the console port of the first stackable device, wherein the topology information specifies a ring topology.

13. The method of claim 7, further comprising performing an authentication process between the first and second stackable devices.

14. A method of configuring a stack comprising:
connecting a plurality of stackable devices with one or more stacking links, wherein each of the one or more stacking links connects a stacking port of one of the stackable devices with a stacking port of another one of the stackable devices;
connecting a user console to a first stackable device of the plurality of stackable devices;
transmitting a stack setup command from the user console to the first stackable device;
designating the first stackable device as an active controller of the stack in response to receiving the stack setup command from the user console, wherein designating the first stackable device as the active controller includes assigning a numerical priority value to the first stackable device; and
establishing a stack with the first stackable device in response to the stack setup command, wherein the stack includes one or more of the plurality of stackable devices;
wherein establishing the stack includes, upon receipt from another stackable device that said other stackable device has a higher numerical priority value than the numerical priority value assigned to the first stackable device, transmitting a message by the first stackable device to such other stackable device to thereby force the numerical priority value of the other stackable device to be changed to be less than the assigned numerical priority value of the first stackable device.

15. The method of claim 14, wherein the step of establishing the stack comprises initiating a discovery process from the first stackable device in response to the stack setup command, wherein the first stackable device requests and receives identifying information from the plurality of stackable devices over the stacking links during the discovery process.

16. The method of claim 15, wherein the step of establishing the stack further comprises displaying a topology of the plurality of stackable devices with the user console in response to the identifying information received by the first stackable device from the plurality of stackable devices during the discovery process.

17. The method of claim 16, wherein the step of displaying the topology of the plurality of stackable devices comprises indicating whether the plurality of stackable devices are connected in a ring topology.

18. The method of claim 16, wherein the step of displaying the topology of the plurality of stackable devices comprises:
identifying a first set of the stackable devices located upstream of the first stackable device; and
identifying a second set of the stackable devices located downstream of the first stackable device.

19. The method of claim 18, wherein the step of displaying the topology of the plurality of stackable devices further comprises:
identifying a number of upstream hops between the first stackable device and each stackable device in the first set of the stackable devices; and
identifying a number of downstream hops between the first stackable device and each stackable device in the second set of stackable devices.

20. The method of claim 15, further comprising:
creating a connectivity database within the first stackable device in response to the identifying information received from the plurality of stackable devices during the discovery process; and then
storing the connectivity database in each of the plurality of stackable devices, wherein the connectivity database is transmitted from the first stackable device to the other stackable devices over the stacking links.

21. The method of claim 14, wherein the step of establishing the stack comprises:
transmitting a first discovery message from the first stackable device to a second stackable device on a first stacking link;
authenticating the first stackable device with the second stackable device; and then
transmitting information identifying the second stackable device to the first stackable device.

22. The method of claim 21, wherein the information identifying the second stackable device includes a unique address associated with the second stackable device.

23. The method of claim 21, wherein the information identifying the second stackable device includes a hop count value that indicates a number of hops between the first stackable device and the second stackable device.

24. The method of claim 21, wherein the information identifying the second stackable device includes a priority value that indicates a priority of the second stackable device relative to the plurality of stackable devices.

25. The method of claim 21, wherein the information identifying the second stackable device includes security information required to access the second stackable device, the method further comprising displaying a request to enter the security information via the user console connected to the first stackable device.

26. The method of claim 25, further comprising:
comparing security information entered via the user console with the security information included in the first response packet; and
including the second stackable device in the topology only if the security information entered via the user console matches the security information included in the first response packet.

27. The method of claim 21, further comprising
transmitting the first discovery message from the second stackable device to a third stackable device on a second stacking link;

authenticating the second stackable device with the third stackable device; and then transmitting information identifying the third stackable device to the first stackable device, through the second stackable device.

28. The method of claim 27, wherein the information identifying the third stackable device includes a hop count value, the method further comprising:

initializing the hop count value in the third stackable device; and incrementing the hop count value with the second stackable device.

29. The method of claim 21, wherein the discovery process further comprises:

transmitting a second discovery message from the first stackable device to a third stackable device on a second stacking link;

authenticating the first stackable device with the third stackable device; and then transmitting information identifying the third stackable device to the first stackable device.

30. The method of claim 29, wherein the first discovery message is transmitted in a first direction from the first stackable device, and the second discovery message is transmitted in a second direction, opposite the first direction, from the first stackable device.

31. The method of claim 21, wherein the step of authenticating comprises:

transmitting a key value from the second stackable device to the first stackable device;

generating a first decoded key value in response to the key value in the first stackable device;

transmitting the first decoded key value from the first stackable device to the second stackable device;

generating a second decoded key value in response to the key value in the second stackable device; and comparing the first decoded key value with the second decoded key value.

32. The method of claim 14, further comprising:

assigning stack ID values to the plurality of stackable devices with the first stackable device, wherein each of the plurality of stackable devices is assigned a unique stack ID value; and displaying the stack ID values assigned to the plurality of stackable devices on the user console.

33. The method of claim 32, further comprising changing the stack ID values assigned to the plurality of stackable devices in response to instructions received by the first stackable device from the user console.

34. A first stackable device comprising:

one or more stacking ports;

a processor;

a computer readable storage medium having stored thereon computer executable instructions that, when executed by the processor, cause the processor to discover a topology of one or more other stackable devices coupled to the one or more stacking ports; and a user interface, wherein the computer executable instructions, when executed by the processor, further cause the processor to transmit information identifying the discovered topology to the user interface;

wherein the computer executable instructions, when executed by the processor, further cause the processor to designate the first stackable device as a master by assigning a numerical priority value to the first stackable device; and wherein upon receipt from another stackable device that said other stackable device has a higher numerical priority value than the numerical priority value assigned to the first stackable device, transmitting a message to such other stackable device to thereby force the numerical priority value of the other stackable device to be changed to be less than the assigned numerical priority value of the first stackable device.

35. The stackable device of claim 34, wherein the computer executable instructions, when executed by the processor, further cause the processor to establish a stack that includes a plurality of stackable devices.

* * * * *